(12) United States Patent
Maki

(10) Patent No.: US 6,267,239 B1
(45) Date of Patent: Jul. 31, 2001

(54) SAW BLADE HOLDER

(75) Inventor: Warren Maki, Crystal Falls, MI (US)

(73) Assignee: Northwoods Molders, Inc., Crystal Falls, MI (US)

( * ) Notice: Subject to any disclaimer, the term of this patent is extended or adjusted under 35 U.S.C. 154(b) by 0 days.

(21) Appl. No.: 09/678,991

(22) Filed: Oct. 4, 2000

Related U.S. Application Data

(60) Provisional application No. 60/158,081, filed on Oct. 7, 1999.

(51) Int. Cl.$^7$ .................................................. B65D 85/02
(52) U.S. Cl. .................................... 206/349; 206/303
(58) Field of Search .................................. 206/303, 349, 206/372, 561, 806; 220/4.21, 4.22; 211/41.1

(56) References Cited

U.S. PATENT DOCUMENTS

| | | |
|---|---|---|
| 102,923 | 5/1870 | Disston . |
| 716,785 | 12/1902 | Taylor . |
| 3,053,424 * | 9/1962 | Reinhard .............................. 206/349 |
| 3,259,231 * | 7/1966 | Romanowski et al. ............. 206/349 |
| 3,870,148 * | 3/1975 | Hite ..................................... 206/372 |
| 4,139,093 | 2/1979 | Holmes . |
| 4,541,528 | 9/1985 | Holmes . |
| 4,588,082 | 5/1986 | Ridings . |
| 4,630,732 | 12/1986 | Snyman . |
| 4,715,492 | 12/1987 | Holmes . |
| 4,811,998 * | 3/1989 | Rankin ................................ 206/303 |
| 4,848,571 * | 7/1989 | Fullar ................................. 206/303 |
| 5,078,266 | 1/1992 | Rackley . |
| 5,456,057 | 10/1995 | Bannon et al. . |
| 6,161,689 * | 12/2000 | Reithel ............................... 206/372 |

\* cited by examiner

*Primary Examiner*—Luan K. Bui
(74) *Attorney, Agent, or Firm*—Howard & Howard

(57) ABSTRACT

A saw blade holder for holding a saw blade is disclosed. The holder includes first and second C-shaped portions that defined an opening for displaying the saw blade. The portions include an annular surface and opposing outer walls that extend inwardly from the annular surfaces. A clasp, including first and second clasping members, extends from the annular surfaces at a top section of the portions. The clasp interlocks to retain the top section in a closed position and disengages to allow the portions to detach from each other at the top section. A detachable hinge, including first and second connecting members, extends from the annular surfaces at a bottom section of the portions. The detachable hinge interlocks to retain the bottom section in the closed position and disengages to allow the portions to detach from each other at the bottom such that now both of the portions are completely detached at the top and bottom into a completely open position and the saw blade can be easily inserted and removed.

30 Claims, 2 Drawing Sheets

SAW BLADE HOLDER

RELATED APPLICATIONS

This patent application claims priority to and all advantages of U.S. Provisional Patent Application No. 60/158,081 which was filed on Oct. 7, 1999.

BACKGROUND OF THE INVENTION

1) Technical Field

The subject invention generally relates to a saw blade holding assembly for holding at least one saw blade. More specifically, the saw blade holding assembly safely holds a saw blade or a plurality of saw blades for safe storage and optimum display of the blade or blades.

2) Description of the Prior Art

Saw blades for circular saws, power mitre saws, and the like are typically packaged using a cardboard backing covered by clear plastic with the saw blade disposed between. The cardboard backing includes an aperture from which the package is hung in a store. The saw blades, which have very sharp cutting teeth 24, are shipped and displayed in this packaging which protects the saw blade from damage and protects a customer from injury. Such cardboard backed packaging is deficient because once the customer purchases the saw blade and removes it from the packaging for use, there is no longer any protection of the saw blade and the user. An example of such cardboard backed packaging is disclosed in U.S. Pat. No. 5,456,057 to Bannon et al.

The prior art discloses other assemblies for holding and packaging saw blades. As a further example, U.S. Pat. No. 102,923 to Disston discloses such an assembly. The saw blade holding assembly disclosed in the Disston patent includes first and second portions defining an opening when the portions are in a closed position. Each of the portions include a radially spaced annular surface and opposing outer walls. This assembly further includes first and second clasping members that interlock at a top of the assembly to retain the portions in the closed position and that disengage to allow the portions to detach from each other at the top. Finally, the saw blade holding assembly disclosed in the Disston patent includes a rigid hinge fixed at a bottom of the assembly that allows the portions to rotate about the hinge and to partially open. As such, this assembly is particularly deficient in that the first and second portions cannot completely detach at the top and the bottom into a completely open position and easy insertion and removal of the saw blade is not facilitated. This assembly is further deficient in that it can only hold one saw blade.

Due to the inefficiencies identified in the conventional saw blade holding and packaging assemblies of the prior art, it is desirable to implement a holding assembly for a saw blade or blades that that may be used to both display and store the saw blade and that completely detaches at both the top and the bottom into a completely open position such that the saw blade can be easily inserted and removed from the assembly. It is also desirable to introduce a saw blade holding assembly that is capable of receiving and holding more than one saw blade.

SUMMARY OF THE INVENTION AND ADVANTAGES

A saw blade holding assembly for holding at least one saw blade is disclosed. The saw blade holding assembly includes first and second portions defining an opening having a center point when the portions are in a closed position. More specifically, the portions are in the closed position when they are interlocked at a first section, or at a top of the portions, and at a second section, or at a bottom of the portions. Each of the portions include an annular surface spaced radially from an axis that extends transversely through the center point of the opening. The subject invention also includes opposing outer walls spaced axially from one another. The outer walls extend inwardly from each of the annular surfaces of the portions toward the center point.

A first clasping member extends from the annular surface of the first portion and a second clasping member extends from the annular surface of the second portion toward the first clasping member. When the first and second portions are in the closed position, the first clasping member interlocks with the second clasping member to retain the first section of the first and second portions in the closed position. The first clasping member disengages from the second clasping member to allow the first and second portions to detach from each other at the first section.

The subject invention further includes first and second connecting members. The first connecting member extends from the annular surface of the first portion and the second connecting member extends from the annular surface of the second portion toward the first connecting member. The first connecting member interlocks with the second connecting member to retain the second section of the portions in the closed position. The first connecting member also disengages from the second connecting member to allow the first and second portions to detach from each other at the second section. As such, both of the portions are completely detached at the first and second sections into a completely open position and the saw blade is easily inserted and removed.

The subject invention also includes a rib extending inwardly from the annular surfaces toward the center point to define a plurality of axially spaced compartments that hold two or more of the saw blades in a spaced relationship from each other.

Accordingly, the subject invention provides a saw blade holding assembly that completely detaches at both a top and the bottom into a completely open position such that a saw blade can be easily inserted and removed from the assembly. The subject invention also includes at least one rib within the annular surfaces of the assembly such that the assembly maintains two or more saw blades in a spaced relationship.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
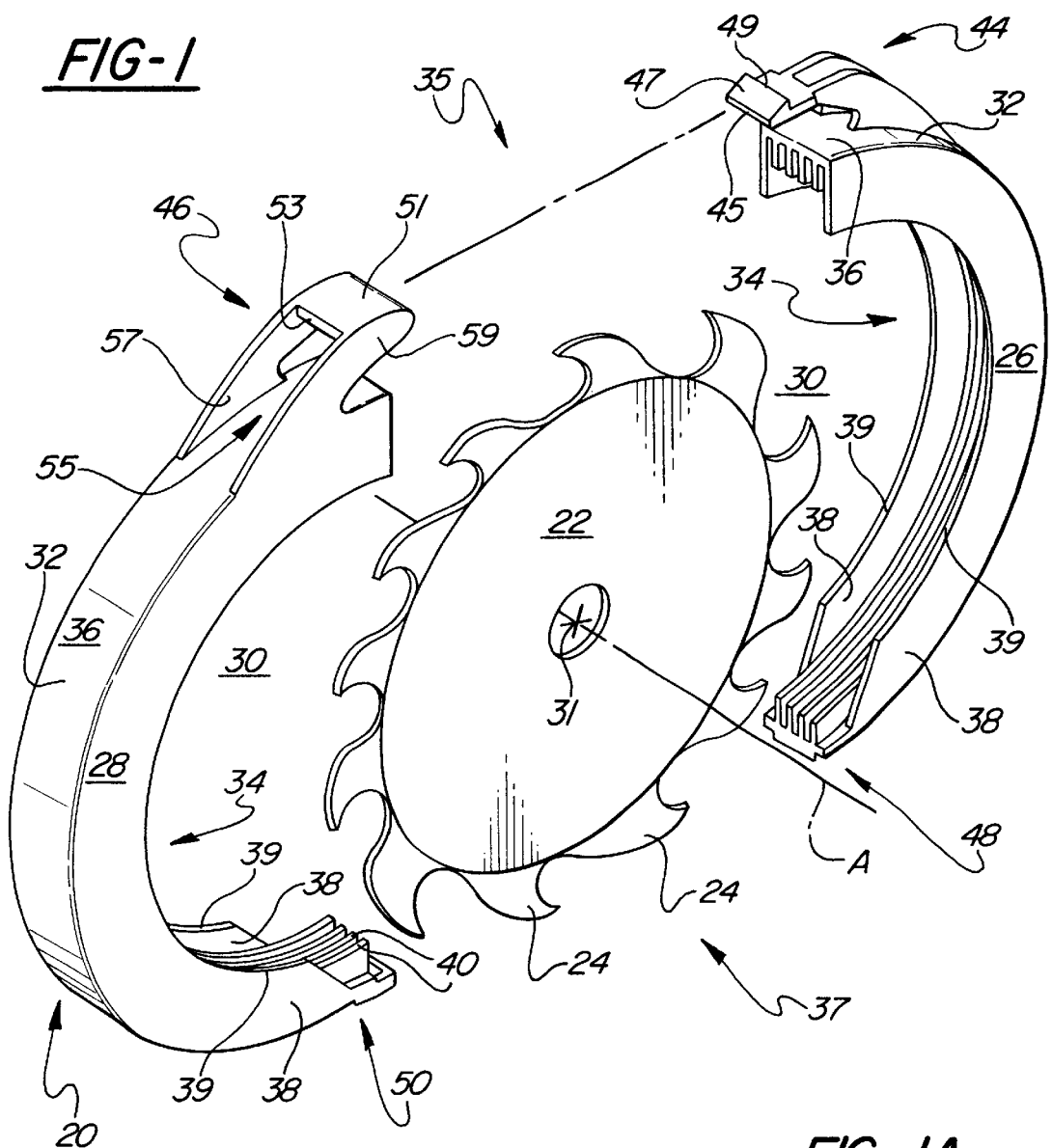
FIG. 1 is a perspective view of a saw blade having teeth and a saw blade holding assembly in an open position.

Referring to the Figures, wherein like numerals indicate like or corresponding parts throughout the several views, a saw blade holding assembly 20 for holding at least one saw blade 22 is disclosed. The saw blade holding assembly 20 of the subject invention is a convenient apparatus which may be used to safely hold and display one or even several saw blades 22 having teeth 24. The saw blade holding assembly 20 is preferably molded from plastic and includes first 26 and second 28 portions. As will be described in greater detail below, the first and second portions 26, 28 are completely detachable from one another.

Figure 2:
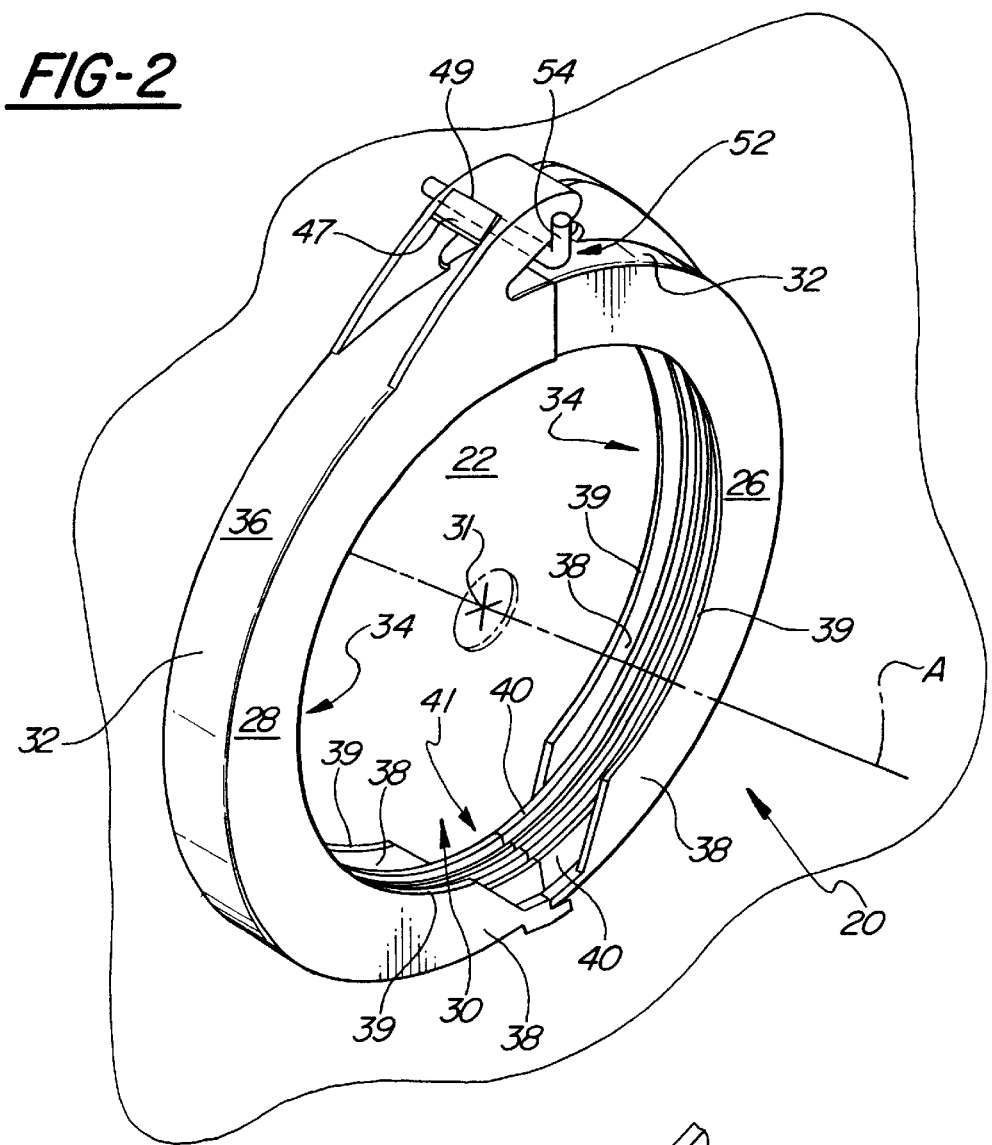
FIG. 2 is a perspective view of the saw blade holding assembly holding the saw blade in a closed position and illustrating a hanger opening adapted to receive a hanging device for supporting said assembly.

The first and second portions 26, 28 define an opening 30 having a center point 31 when the portions 26, 28 are in a closed position (FIG. 2). It is to be understood that the portions 26, 28 are in the closed position when they are interlocked at a first section, or at a top 35 of the portions 26, 28, and at a second section, or at a bottom 37 of the portions 26, 28. This will be further described below. The saw blade 22 is visible through the opening 30 between the portions 26, 28. As discussed above, this is ideal for display of the saw blade 22. In the preferred embodiment of the subject invention, as shown in the Figures, the first and second portions 26, 28 are substantially C-shaped to encompass the saw blade 22 and its teeth 24.

Each of the portions 26, 28 include an annular surface 32 spaced radially from an axis A. The axis A extends transversely through the center point 31 of the opening 30. The annular surfaces 32 of the portions 26, 28 each include inner 34 and outer 36 surfaces. The subject invention also includes opposing outer walls 38 spaced axially from one another. The opposing outer walls 38 extend inwardly from each of the annular surfaces 32 of the portions 26, 28 toward the center point 31. As shown in the Figures, the saw blade 22, including the teeth 24, is securely retained between the portions 26, 28 as it is encompassed between the annular surfaces 32 and the outer walls 38.

The opposing outer walls 38 include inner edges 39. That is, each of the opposing outer walls 38 include an inner edge 39. The inner edges 39 of the opposing outer walls 38 extend toward the annular surfaces 32 to define a window 41 (see FIG. 1A). As shown in FIG. 1A, the window 41 is an extension of the opening 30, and is defined within the opposing outer walls 38 at the bottom 37 of the first and second portions 26, 28. As such, a portion of the saw blade 22, such as the teeth 24 of the saw blade 22 or an edge of a grinding wheel, is displayed and the blade 22 or wheel can be identified by the user by the type of teeth 24 or edge. Although not shown in the Figures, in an alternative embodiment of the subject invention, the window 41 is not defined by the inner edges 39 of the opposing outer walls 38 extending toward the annular surfaces 32. Instead, the window 41 is defined between the inner edges 39 and the annular surfaces 32 such that it is not merely an extension of the opening 30 and is entirely enclosed within the opposing outer walls 38.

Figure 3:
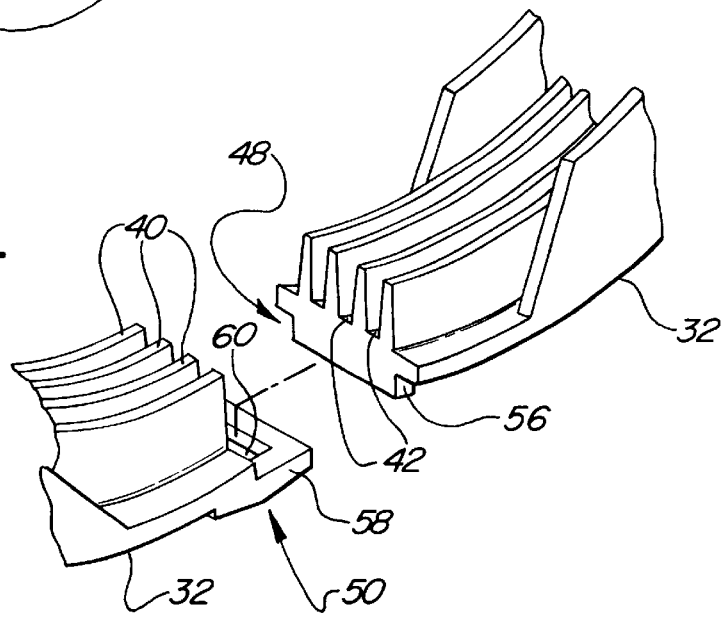
FIG. 3 is an enlarged perspective view of first and second connecting members of the subject invention illustrated in a completely open position.

As shown throughout the Figures, at least one rib 40 extends inwardly from the inner surfaces 34 of the annular surfaces 32 toward the center point 31 to define a plurality of axially spaced compartments 42 (refer to FIG. 3). The rib 40 extends inwardly between the outer walls 38. The axially spaced compartments 42 are adapted to hold or maintain two or more of the saw blades 22 in a spaced relationship from each other. More specifically, the teeth 24 of the saw blade 22 are received within the axially spaced compartments 42. This protects the blades 22 from damage and protects a user from injury. It is to be understood that the number of ribs 40 and the spacing of ribs 40 may be modified to accommodate different numbers of blades 22 and also blades 22 of various thicknesses, such as a wire wheel or a grinder wheel. Moreover, holding assemblies of different diameters may be provided to accommodate blades 22 of a particular diameter. Although the rib 40 enables the subject invention to hold more than one saw blade 22 in the spaced relationship, for descriptive purposes only, the subject invention will be described below only in terms of a single saw blade 22.

Figure 1A:
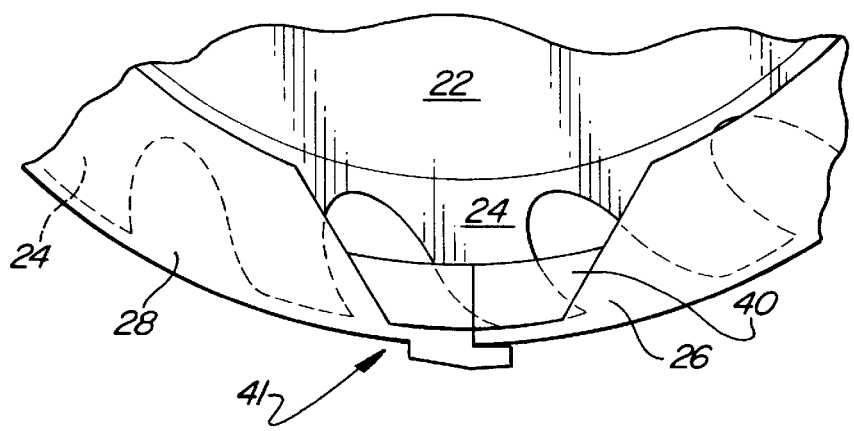
FIG. 1A is a perspective view of a window defined in the saw blade holding assembly such that a user can view the saw blade and identify the saw blade by the teeth.

Referring primarily to FIG. 1, the portions 26, 28 are secured together by first 44 and second 46 clasping members at the top 35 and by first 48 and second 50 connecting members at the bottom 37. As shown in the Figures, the clasping members 44, 46 are disposed substantially 180 degrees along the annular surfaces 32 from the connecting members 48, 50. As such, the clasping members 44, 46 are disposed in opposition to the connecting members 48, 50. However, it is to be understood that it is not absolutely required that the clasping members 44, 46 and the connecting members 48, 50 are disposed 180 degrees from one another. Instead, the subject invention focuses on the inclusion of both the clasping members 44, 46 and the connecting members 48, 50 such that the assembly 20 is completely detachable as will be discussed below. It is also to be understood that the clasping members 44, 46 can be interchanged with the connecting members 48, 50, and vice versa without varying the scope of the subject invention.

Referring to FIGS. 1 and 2, the first clasping member 44 extends from the annular surface 32 of the first portion 26 and the second clasping member 46 extends from the annular surface 32 of the second portion 28 toward the first clasping member 44. As shown only in FIG. 2, the first clasping member 44 interlocks with the second clasping member 46 to retain the first section, i.e., the top 35, of the first and second portions 26, 28 in the closed position. This interlocking holds the top 35 of the portions 26, 28 together. Alternatively, as shown only in FIG. 1, the first clasping member 44 disengages from the second clasping member 46 to allow the first and second portions 26, 28 to detach from each other at the top 35 of the portions 26, 28.

More specifically, the first clasping member 44 includes a distal edge 45 adjacent the second clasping member 46 when the clasping members 44, 46 are in the closed position, and a flexible depression tab 47 is disposed at the distal edge 45. The flexible depression tab 47 includes a locking surface 49 extending outwardly from the distal edge 45 away from the center point 31.

The second clasping member 46 also includes a distal edge 51. The distal edge of the second clasping member 46 is adjacent the first clasping member 44 when the clasping members 44, 46 are in the closed position. An engagement lip 53 is disposed at the distal edge 51 of the second clasping member 46, and an aperture 55 is defined between the second clasping member 46 and the outer surface 36 of the second portion 28. The second clasping member 46 is more specifically defined by first 57 and second 59 lateral reinforcements. The lateral reinforcements 57, 59 extend from the outer surface 36 of the second portion 28 toward the distal edge 51 of the second clasping member 46. As such, the engagement lip 53 and the aperture 55 are disposed between the lateral reinforcements 57, 59.

Referring only to FIG. 1, when depressed or otherwise manipulated, the flexible depression tab 47 flexes the first clasping member 44 toward the annular surfaces 32. This disengages the first clasping member 44 from the second clasping member 46. More specifically, the locking surface 49 of the flexible depression tab 47 disengages from the engagement lip 53 of the second clasping member 46. As a result, the portions 26, 28 detach from each other at the top 35.

Alternatively, referring only to FIG. 2, the aperture 55 between the lateral reinforcements 57, 59 receives the first clasping member 44 to retain the top 35 of the portions 26, 28 in the closed position. More specifically, the flexible depression tab 47 of the first clasping member 44 extends into the aperture 55 between the lateral reinforcements 57, 59 such that the locking surface 49 of the depression tab 47 interlocks with the engagement lip 53 of the second clasping member 46 to retain the top 35 of the portions 26, 28 in the closed position.

A hanger opening 52 is formed between the first and second clasping members 44, 46 and the annular surfaces 32 of the first and second portions 26, 28 at the top 35 of the portions 26, 28 when the first and second portions 26, 28 are in the closed position. The hanger opening 52 provides the structure by which the assembly 20 may be hung for display or storage. That is, as shown in FIG. 2, a user may hang the saw blade 22 from a hanging device 54, such as a hook or peg, via the hanger opening 52 when the saw blade 22 is not in use. As such, the hanger opening 52 is adapted to receive the hanging device 54 to support he assembly 20.

Referring now to FIGS. 1 and 3, the first connecting member 48 extends from the annular surface 32 of the first portion 26 and the second connecting member 50 extends from the annular surface 32 of the second portion 28 toward the first connecting member 48. The first connecting member 48 is further defined as a protrusion 56 extending outwardly from the outer surface 36 of the first portion 26 away from the center point 31. The second connecting member 50 is further defined as a locking member 58 extending outwardly from and tangential to the outer surface 36 of the second portion 28 toward the protrusion 56. In operation, the locking member 58 of the second connecting member 50 receives the protrusion 56 of the first connecting member 48. As shown best in FIG. 3, the locking member 58 is substantially U-shaped and extends from the second portion 28 to define a hinge opening 60. The hinge opening 60 is rectangular.

Referring to FIG. 2, the first connecting member 48 interlocks with the second connecting member 50 to retain the second section, i.e., the bottom 37, of the first and second portions 26, 28 in the closed position. More specifically, the protrusion 56 of the first connecting member 48 is complimentary in shape to the hinge opening 60 and extends into the hinge opening 60 to interlock with the locking member 58 of the second connecting member 50. This retains the bottom 37 of the portions 26, 28 in the closed position.

Alternatively, referring to FIGS. 1 and 3, the first connecting member 48 disengages from the second connecting member 50 to allow the first and second portions 26, 28 to detach from each other at the bottom 37 of the portions 26, 28. Generally, when the depression tab 47 is depressed, the first and second connecting members 48, 50 briefly function as a hinge. The assembly 20 briefly pivots about the first and second connecting members 48, 50 until the protrusion 56 completely detaches from the hinge opening 60. When this occurs, both of the portions 26, 28 are now completely detached at both the top 35 and bottom 37 into a completely open position (as shown in FIG. 1). The user of the assembly 20 can now easily insert and/or remove the saw blade 22 from the assembly 20.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that the invention may be practiced otherwise than as specifically described.

What is claimed is:

1. A saw blade holding assembly for holding at least one saw blade, said assembly comprising:

first and second portions defining an opening having a center point when said portions are in a closed position, each of said portions including an annular surface spaced radially from an axis extending transversely through said center point of said opening;

opposing outer walls spaced axially from one another and extending inwardly from each of said annular surfaces of said portions toward said center point;

a first clasping member extending from said annular surface of said first portion and a second clasping member extending from said annular surface of said second portion toward said first clasping member, said first clasping member interlocking with said second clasping member to retain a first section of said first and second portions in said closed position, and said first clasping member disengaging from said second clasping member to allow said first and second portions to detach from each other at said first section; and a first connecting member extending from said annular surface of said first portion and a second connecting member extending from said annular surface of said second portion toward said first connecting member, said first connecting member interlocking with said second connecting member to retain a second section of said first and second portions in said closed position, and said first connecting member disengaging from said second connecting member to allow said first and second portions to detach from each other at said second section thereby completely detaching both of said portions at said first and second sections into a completely open position to facilitate easy insertion and removal of the saw blade.

2. An assembly as set forth in claim 1 wherein said annular surfaces of said first and second portions each include an inner surface and an outer surface.

3. An assembly as set forth in claim 2 wherein said first connecting member is further defined as a protrusion extending outwardly from said outer surface of said first portion away from said center point.

4. An assembly as set forth in claim 3 wherein said second connecting member is further defined as a locking member extending outwardly from and tangential to said outer surface of said second portion toward said protrusion to receive said protrusion.

5. An assembly as set forth in claim 4 wherein said locking member is substantially U-shaped and extends from said second portion to define a hinge opening, said protrusion extending into said hinge opening and interlocking with said locking member to retain said second section of said first and second portions in said closed position.

6. An assembly as set forth in claim 2 wherein said first clasping member includes a distal edge adjacent said second clasping member when said clasping members are in said closed position and a flexible depression tab disposed at said distal edge of said first clasping member that flexes said first clasping member toward said annular surfaces when depressed to disengage said first clasping member from said second clasping member and to allow said portions to detach from each other at said first section.

7. An assembly as set forth in 6 wherein said flexible depression tab includes a locking surface extending outwardly from said distal edge away from said center point to interlock with said second clasping member to retain said first section of said first and second portions in said closed position.

8. An assembly as set forth in claim 7 wherein said second clasping member includes a distal edge adjacent said first clasping member when said clasping members are in said closed position and an engagement lip disposed at said distal edge of said second clasping member that interlocks with said locking surface of said first clasping member to retain said first section of said first and second portions in said closed position.

9. An assembly as set forth in claim 8 further including an aperture defined between said second clasping member and said outer surface of said second portion, said aperture receiving said first clasping member to retain said first section of said first and second portions in said closed position.

10. An assembly as set forth in claim 9 wherein said second clasping member is further defined by first and second lateral reinforcements extending from said outer surface of said second portion toward said distal edge of said second clasping member, said engagement lip and said aperture being disposed between said lateral reinforcements.

11. An assembly as set forth in claim 10 wherein said flexible depression tab extends into said aperture between said lateral reinforcements such that said locking surface of said depression tab interlocks with said engagement lip of said second clasping member.

12. An assembly as set forth in claim 1 further including a hanger opening formed between said first and second clasping members and said annular surfaces of said first and second portions at said first section when said first and second portions are in said closed position, said hanger opening adapted to receive a hanging device for supporting said assembly.

13. An assembly as set forth in claim 1 wherein said first and second portions are substantially C-shaped to encompass the saw blade between said annular surfaces and said outer walls.

14. An assembly as set forth in claim 1 wherein said first and second clasping members are disposed substantially 180 degrees along said annular surfaces from said first and second connecting members such that said clasping members are disposed opposite from said connecting members.

15. An assembly as set forth in claim 2 further including at least one rib extending inwardly from said inner surfaces toward said center point to define a plurality of axially spaced compartments adapted to hold a plurality of saw blades.

16. An assembly as set forth in claim 1 wherein said opposing outer walls include inner edges, said inner edges of said opposing outer walls extending toward said annular surfaces to define a window such that a portion of the saw blade is displayed for identification of the saw blade.

17. An assembly as set forth in claim 16 wherein said window is an extension of said opening to display the portion of the saw blade.

18. An assembly as set forth in claim 17 wherein said window is defined within said opposing outer walls at said second section of said first and second portions.

19. A saw blade holding assembly comprising:
at least one saw blade;
first and second portions defining an opening having a center point when said portions are in a closed position, each of said portions including an annular surface spaced radially from an axis extending transversely through said center point of said opening;
opposing outer walls spaced axially from one another and extending inwardly from each of said annular surfaces of said portions toward said center point;
said assembly characterized by at least one rib extending inwardly from said annular surfaces toward said center point to define a plurality of axially spaced compartments for holding said saw blades in a spaced relationship from each other.

20. An assembly as set forth in claim 19 further including a first clasping member extending from said annular surface of said first portion and a second clasping member extending from said annular surface of said second portion toward said first clasping member, said first clasping member interlocking with said second clasping member to retain a first section of said first and second portions in said closed position, and said first clasping member disengaging from said second clasping member to allow said first and second portions to detach from each other at said first section.

21. An assembly as set forth in claim 20 further including a first connecting member extending from said annular surface of said first portion and a second connecting member extending from said annular surface of said second portion toward said first connecting member, said first connecting member interlocking with said second connecting member to retain a second section of said first and second portions in said closed position, and said first connecting member disengaging from said second connection member to allow said first and second portions to detach from each other at said second section thereby completely detaching both of said portions at said first and second sections into a completely open position to facilitate easy insertion and removal of the saw blade.

22. An assembly as set forth in claim 21 wherein said annular surfaces of said first and second portions each include an inner surface and an outer surface.

23. An assembly as set forth in claim 22 wherein said first connecting member is further defined as a protrusion extending outwardly from said outer surface of said first portion away from said center point.

24. An assembly as set forth in claim 23 wherein said second connecting member is further defined as a locking member extending outwardly from and tangential to said outer surface of said second portion toward said protrusion to receive said protrusion.

25. An assembly as set forth in claim 20 wherein said first clasping member includes a distal edge adjacent said second clasping member when said clasping members are in said closed position and a flexible depression tab disposed at said distal edge of said first clasping member that flexes said first clasping member toward said annular surfaces when depressed to disengage said first clasping member from said second clasping member and to allow said portions to detach from each other at said first section.

26. An assembly as set forth in 25 wherein said flexible depression tab includes a locking surface extending outwardly from said distal edge away from said center point to interlock with said second clasping member to retain said first section of said first and second portions in said closed position.

27. An assembly as set for in claim 20 further including a hanger opening formed between said first and second clasping members and said annular surfaces of said first and second portions at said first section when said first and second portions are in said closed position, said hanger opening adapted to receive a hanging device for supporting said assembly.

28. An assembly as set forth in claim 21 wherein said first and second clasping members are disposed substantially 180 degrees along said annular surfaces from said first and second connecting members such that said clasping members are disposed opposite from said connecting members.

29. An assembly as set forth in claim 19 wherein said first and second portions are substantially C-shaped to encompass said saw blade between said annular surfaces and said outer walls.

30. An assembly as set forth in claim 19 wherein said opposing outer walls include inner edges, said inner edges of said opposing outer walls extending toward said annular surfaces to define a window such that a portion of said saw blade is displayed for identification of the saw blade.

* * * * *